(12) United States Patent
Rothenbury

(10) Patent No.: US 7,924,489 B2
(45) Date of Patent: Apr. 12, 2011

(54) HIDDEN MICROMIRROR SUPPORT STRUCTURE

(75) Inventor: David A. Rothenbury, Cedar Park, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/419,103

(22) Filed: Apr. 6, 2009

(65) Prior Publication Data

US 2009/0188786 A1 Jul. 30, 2009

Related U.S. Application Data

(62) Division of application No. 11/477,998, filed on Jun. 29, 2006, now Pat. No. 7,529,015.

(51) Int. Cl.
*G02B 26/08* (2006.01)
*C23C 14/00* (2006.01)
*B29D 11/00* (2006.01)

(52) U.S. Cl. .................. 359/224.1; 204/192.27; 216/24

(58) Field of Classification Search ............... 359/224.1, 359/290, 291; 438/39, 700; 204/192.27; 216/24
See application file for complete search history.

(56) References Cited

U.S. PATENT DOCUMENTS

| 5,631,782 A | 5/1997 | Smith et al. |
| 5,650,881 A | 7/1997 | Hornbeck |
| 7,529,015 B2 | 5/2009 | Rothenbury |
| 7,630,114 B2 * | 12/2009 | Wang et al. .................. 359/237 |

\* cited by examiner

*Primary Examiner* — William C Choi
(74) *Attorney, Agent, or Firm* — Charles A. Brill; Wade James Brady, III; Frederick J. Telecky, Jr.

(57) ABSTRACT

Methods and apparatus for use with a micromirror element includes a micromirror a micromirror having a substantially flat outer surface disposed outwardly from a support structure that is operable to at least partially support the micromirror. The support structure includes at least one layer overlying at least two discrete planes that are both substantially parallel to the outer surface of the micromirror. In one particular embodiment, the support structure includes annular-shaped sidewalls that encapsulate a photoresist plug.

7 Claims, 2 Drawing Sheets

HIDDEN MICROMIRROR SUPPORT STRUCTURE

This application is a divisional of application Ser. No. 11/477,998, filed Jun. 29, 2006.

TECHNICAL FIELD

This invention relates in general to spatial light modulators and, in particular, to a digital micromirror device having an improved micromirror support structure and a method of manufacturing the same.

BACKGROUND

A vast array of semiconductor devices utilize physical vapor deposition (PVD) techniques in conjunction with deep ultraviolet (DUV) photolithography. PVD is a group of vacuum coating techniques used to deposit thin films of various materials onto various surfaces (e.g., of semiconductor wafers) by physical means, as compared to chemical vapor deposition. DUV is used for very fine resolution photolithography, a procedure where a chemical known as a photoresist is exposed to UV radiation which has passed through a mask. The light allows chemical reactions to take place in the photoresist, and after development (a step that either removes the exposed or unexposed photoresist), a geometric pattern which is determined by the mask remains on the sample. Further steps may then be taken to "etch" away parts of the sample with no photoresist remaining.

The processing of microelectromechanical systems (MEMS) often incorporates PVD techniques in conjunction with photolithography. In addition, MEMS processing frequently includes structures that are spaced apart by rigid supports.

SUMMARY OF THE EXAMPLE EMBODIMENTS

In one embodiment, a micromirror element comprises a micromirror having a substantially flat outer surface disposed outwardly from at least one support structure. The at least one support structure is operable to at least partially support the micromirror. In addition, the at least one support structure comprises at least one layer overlying at least two discrete planes that are both parallel to the outer surface of the micromirror.

In a method embodiment, a method of forming a micromirror element comprises forming a sacrificial layer and selectively removing a portion of the sacrificial layer to form at least one micromirror support via. The method further comprises forming a first portion of a micromirror support structure within the at least one micromirror support via and a second portion of the micromirror support structure outwardly from the sacrificial layer. In addition, the method comprises forming a substantially flat micromirror surface outwardly from the first and second portions of the micromirror support structure.

Technical advantages of some embodiments of the invention may include increasing the contrast ratio of the DMD by increasing the fill-factor ratio of total reflective surfaces while minimizing stray reflections. In some embodiments, a substantially sold micromirror support structure may enhance structural rigidity. Additionally, some embodiments may comprise micromirror support structure having increased conductive sidewall thickness, thereby potentially enhancing conductivity between conductive layers. Some particular embodiments may include the same number of process steps as conventional DMD processing.

It will be understood that the various embodiments of the present invention may include some, all, or none of the enumerated technical advantages. In addition other technical advantages of the present invention may be readily apparent to one skilled in the art from the figures, description, and claims included herein.

BRIEF DESCRIPTION OF THE DRAWINGS

For a more complete understanding of the present invention and features and advantages thereof, reference is now made to the following description, taken in conjunction with the accompanying drawings, in which.

DESCRIPTION OF EXAMPLE EMBODIMENTS

Particular examples and dimensions specified throughout this document are intended for example purposes only, and are not intended to limit the scope of the present disclosure. In particular, this document is not intended to be limited to a particular spatial light modulator device, such as, a digital micromirror device. Moreover, the illustrations in FIGS. 1 through 2D are not necessarily drawn to scale.

Figure 1:
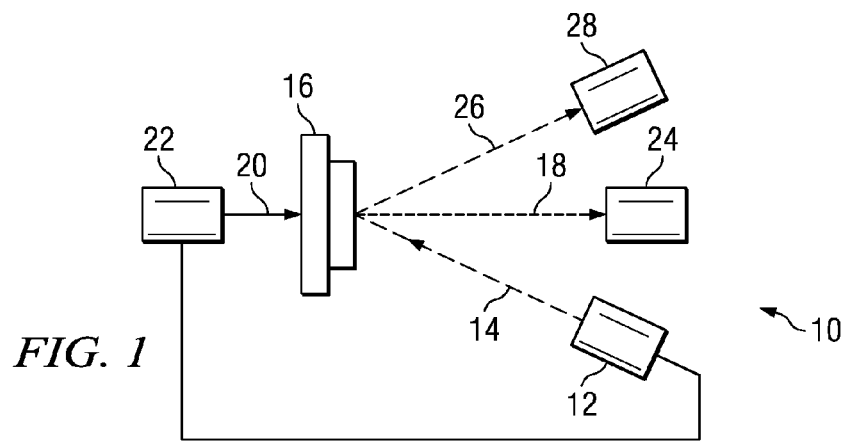
FIG. 1 is a block diagram of one embodiment of a portion of a display system.

FIG. 1 is a cross-sectional block diagram of one embodiment of a portion of a light processing system 10 that may be used with other embodiments of the invention. The display system 10 of FIG. 1 includes a light source module 12 capable of generating illumination light beams 14. Light beams 14 are directed from light source module 12 to a modulator 16. Modulator 16 may comprise any device capable of selectively communicating at least some of the received light beams along a projection light path 18. In various embodiments, modulator 16 may comprise a spatial light modulator, such as, for example, a liquid crystal display, a light emitting diode modulator, or a liquid crystal on silicon display. In the illustrated embodiment, however, modulator 16 comprises a digital micromirror device (DMD).

A DMD is a microelectromechanical device comprising an array of hundreds of thousands of tilting digital micromirrors. In a flat or neutral state, each micromirror may be substantially parallel to projection lens 24. Each micromirrors may be tilted, for example, to a positive or negative angle corresponding to an "on" state and an "off" state. In particular embodiments, the micromirrors may tilt, for example, from +12 degrees to a −12 degrees. Although particular embodiments, may have micromirrors that tilt from +12 degrees to a −12 degrees, any other appropriate tilt angle may be used without departing from the scope of the present disclosure. To permit the micromirrors to tilt, one or more support structure attaches each micromirror to one or more hinges. Each hinge is mounted on support structure and spaced by means of an air gap over underlying control circuitry. The control circuitry provides the desired voltages to the respective layers, based at least in part on image data 20 received from a control module 22. In various embodiments, modulator 16 is capable of generating various levels or shades for each color received.

Electrostatic forces cause each micromirror to selectively tilt. Incident illumination light on the micromirror array is reflected by the "on" micromirrors along projection path 18 for receipt by projection lens 24. Additionally, illumination light beams 14 are reflected by the "off" micromirrors and directed on off-state light path 26 toward light absorber 28. The pattern of "on" versus "off" mirrors (e.g., light and dark mirrors) forms an image that is projected by projection lens 24.

Light source module 12 includes one or more lamps or other light sources capable of generating and focusing an illumination light beam. Although display system 10 is described and illustrated as including a single light source module 12, it is generally recognized that display system 10 may include any suitable number of light sources modules appropriate for generating light beams for transmission to modulator 16.

As discussed above, display system 10 includes a control module 22 that receives and relays image data 20 to modulator 16 to effect the tilting of micromirrors in modulator 16. Specifically, control module 22 may relay image data 20 that identifies the appropriate tilt of the micromirrors of modulator 16. For example, control module 22 may send image data 20 to modulator 16 that indicates that specific micromirrors of modulator 16 should be positioned in the "on" state. Accordingly, the micromirrors may be positioned at a tilt angle on the order of approximately +12 degrees, as measured from projection path 18. Alternatively, control module 22 may send image data 20 to modulator 16 that indicates specific micromirrors should be positioned in the "off" state. As such, the micromirrors may be positioned at a tilt angle on the order of approximately −12 degrees, as measured from projection path 18.

For conventional DMDs, the formation of micromirror support posts creates a hollow opening in the center of the micromirror that inhibits optical performance and reliability for a variety of reasons. In many instances, prior attempts to support a micromirror without this hollow opening complicated DMD processing and increased production costs. Accordingly, teachings of some embodiments of the invention recognized design and processing techniques that provide a homogeneously flat micromirror surface without significantly increasing production costs or process steps. In such embodiments, the homogeneous outer surface of each micromirror may increase the contrast ratio of the DMD by increasing the fill-factor ratio of total reflective surfaces while minimizing stray reflections. In some embodiments, a substantially solid micromirror support structure (e.g., support structure 275 of FIG. 2D) may enhance structural rigidity. Some embodiments may include a micromirror support structure having increased micromirror post thicknesses (e.g., micromirror posts 270 in FIG. 2D), thereby potentially enhancing conductivity between conductive layers (e.g., between hinge layer 210 and micromirror layer 260 in FIG. 2D). As will be shown in FIGS. 2A through 2C, some embodiments may not even require increasing the total number of process steps associated with conventional DMD processing.

Figure 2A:
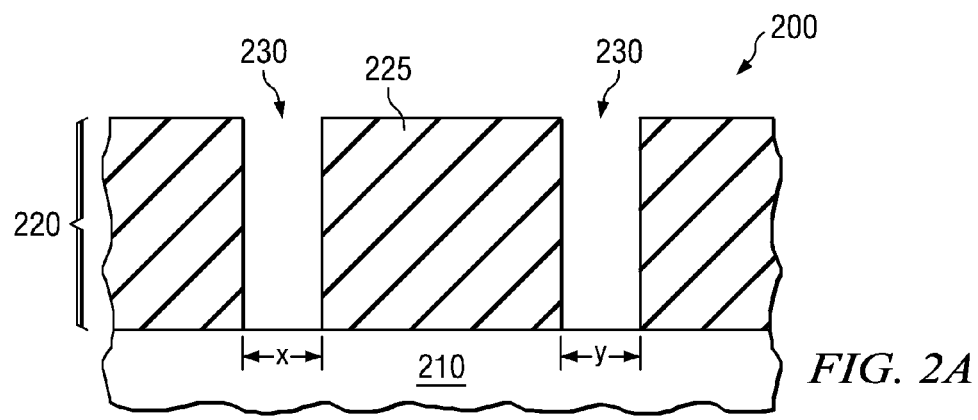
FIGS. 2A and 2C through 2D are cross-sectional views illustrating one example of a method of forming a portion of a digital micromirror device.

FIG. 2A shows a cross-sectional view of a portion of DMD 200 after the formation of a sacrificial layer 220 disposed outwardly from hinge layer 210, and after formation of a micromirror support vias 230 within sacrificial layer 220. Although sacrificial layer 220 and hinge layer 210 are shown as being formed without interstitial layers between them, such interstitial layers could alternatively be formed without departing from the scope of the present disclosure. Sacrificial layer 220 may comprise, for example, oxide, hardened photoresist, or other material that may be selectively removed. That is, sacrificial layer 220 can be selectively removed using any number of processes, such as, for example, by performing a plasma-ash that does not significantly affect hinge layer 210.

Forming sacrificial layer 220 may be effected through any of a variety of processes. In one non-limiting example, sacrificial layer 220 can be formed by depositing an oxide or photoresist material. In some cases, sacrificial layer 220 can be etched or polished back to a desired thickness, such as, for example, by using a chemical mechanical polish (CMP) technique. In particular embodiments, sacrificial layer 220 may comprise a final thickness of approximately 1 m. In other embodiments, sacrificial layer 220 may comprise a final thickness greater than 1 m or less than 1 m.

Forming micromirror support vias 230 associated with a particular micromirror may be effected through any of a variety of processes. For example, micromirror support vias 230 may be formed by removing substantially all of a portion of sacrificial layer 220. In this particular embodiment, micromirror support vias 230 are formed by patterning and etching sacrificial layer 220 using deep ultraviolet light (DUV) photolithography. In this particular embodiment, micromirror support vias 230 comprise widths (x and y) of approximately 0.35 m each. Although micromirror support vias 230 are both approximately 0.35 m wide in this example, any appropriate widths or combination of widths may be used without departing from the scope of the present disclosure.

Figure 2B:
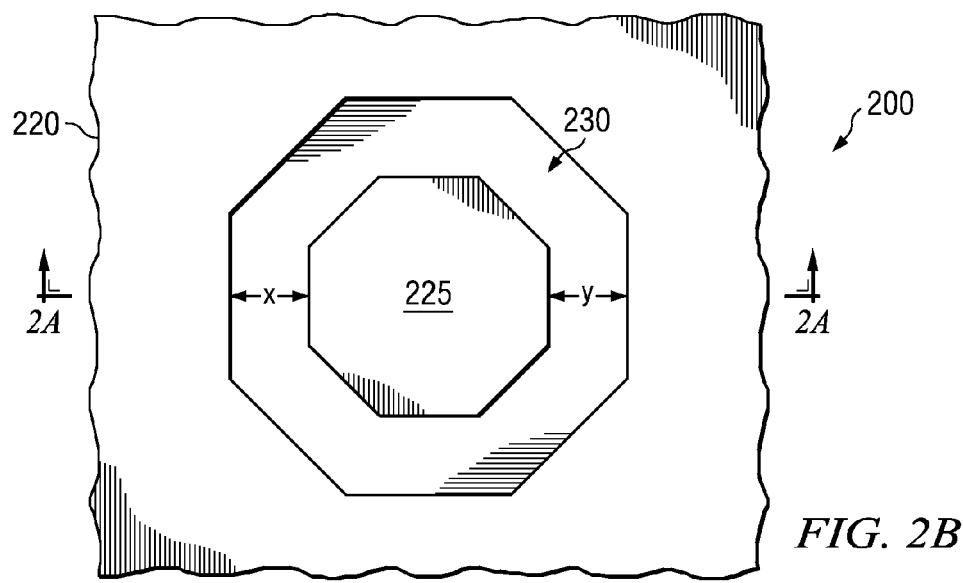
FIG. 2B is a perspective view illustrating one example of a method of forming a portion of a digital micromirror device.

FIG. 2B is a perspective view illustrating a particular example embodiment of forming a portion of a digital micromirror (DMD) device 200 after selectively removing an annular-shaped micromirror support via 230 from a sacrificial layer 220 disposed outwardly from a hinge layer (e.g., hinge layer 210 in FIG. 2A). Sacrificial layer 220 may comprise, for example, materials substantially similar in composition as the sacrificial layer 220 of FIG. 2A. Likewise, the partial removal of sacrificial layer 220 may be effected by any of a variety of processes similar to those disclosed in FIG. 2A. In this particular embodiment, the partial removal of sacrificial layer 220 forms a sacrificial layer plug 225 that is separated from sacrificial layer 220 by a width of approximately 0.35 m (e.g., widths x and y). As will be shown, subsequent layers disposed outwardly from sacrificial layer 220 may encapsulate sacrificial layer plug 225 thereby forming a "filled via" or a substantially solid support structure. Although this particular embodiment uses an annular-shaped micromirror support via 230, other shapes or combinations of discrete support vias may be used without departing from the scope of the present disclosure. For example, micromirror support via 230 may alternatively be C-shaped or include a plurality of support posts or pillars.

Figure 2C:
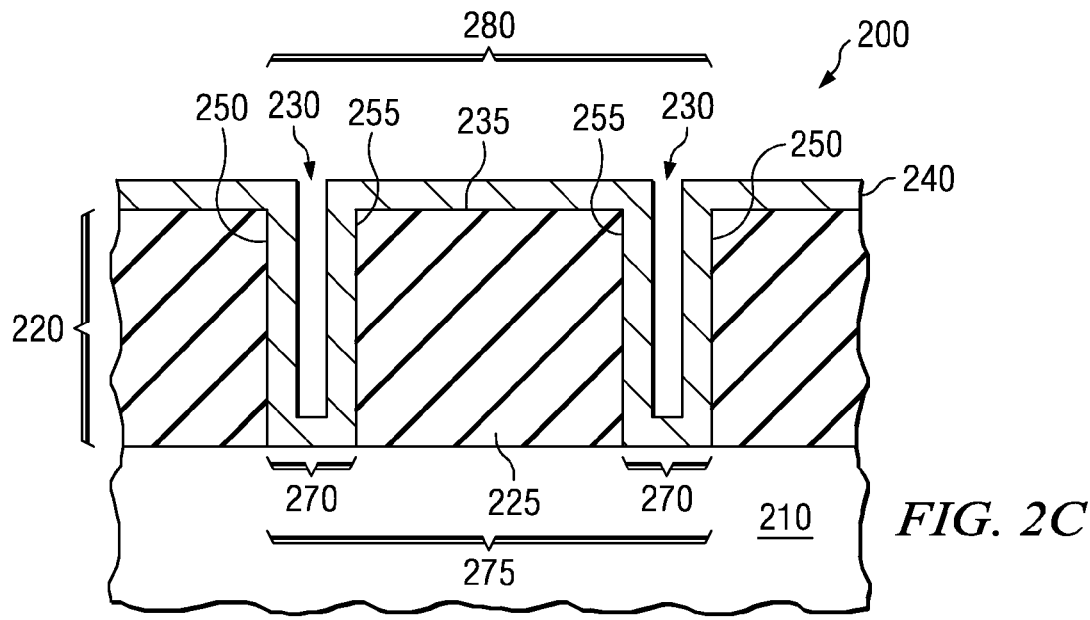
Figure 2D:
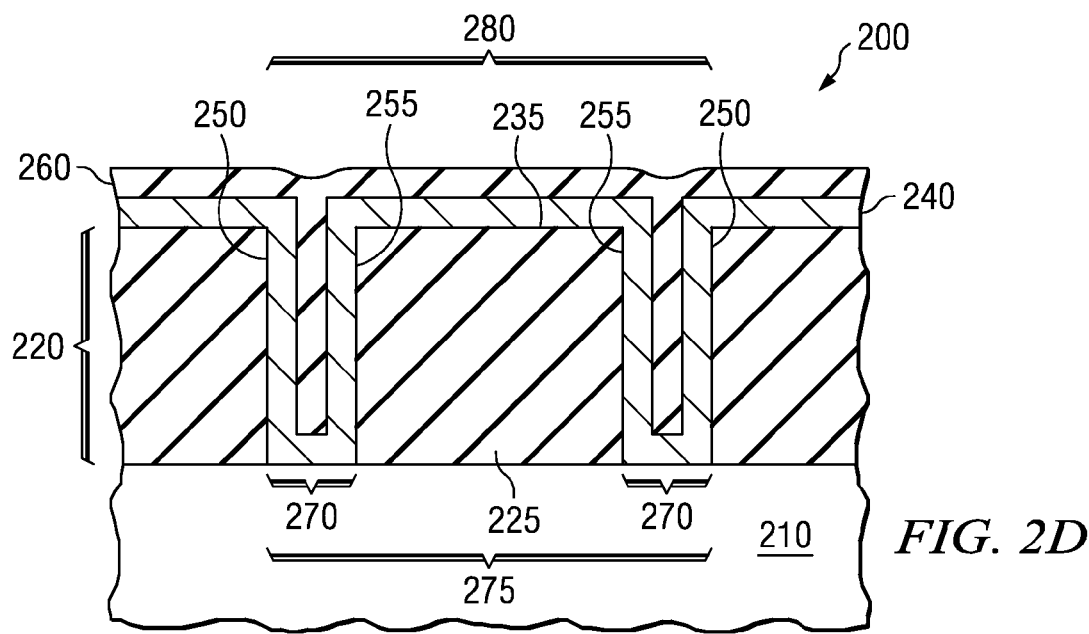

FIG. 2C shows a cross sectional view of DMD 200 after formation of a micromirror support layer 240 outwardly from sacrificial layer 220 and after formation of the support sidewalls 250, 255 within support vias 230. Although micromirror support layer 240 and sacrificial layer 220 are shown as being formed without interstitial layers between them, such interstitial layers could alternatively be formed without departing from the scope of the present disclosure. Support sidewalls 250, 255 supporting a particular micromirror comprise outer sidewalls 250 and inner sidewalls 255. In this particular embodiment, the support bases 270 connect support sidewalls 250, 255 and electrically interconnect micromirror support layer 240 to hinge layer 210. The term "micromirror support structure" 275 should be interpreted as generally defining the volume circumscribed by outer sidewalls 250. In this particular example, micromirror support structure 275 overlies two parallel planes as indicated by reference numbers 235, 270. In particular embodiments, the micromirror support structure 275 may have voids disposed inwardly from a flat surface. In other embodiments, micromirror support structure may be substantially solid.

Micromirror support layer 240 may comprise, for example, aluminum, silicon, polysilicon, tungsten, nitride, and/or combinations of the preceding. In this example, micromirror support layer 240 comprises a reflective material, such as, for example, aluminum, an aluminum alloy, or any other appropriate reflective material. Although micromirror support layer 240 comprises a reflective material in this example, any other desired conductive material can be used without departing from the scope of the present disclosure. Forming micromirror support layer 240 may be effected through any of a variety of processes. For example, micromirror support layer 240 can be formed by depositing an anisotropic physical vapor deposition (PVD) layer of an aluminum alloy. In one non-limiting example, micromirror support layer 240 can be formed by depositing metal to a thickness of approximately 820 angstroms. Although this example uses a thickness of approximately 820 angstroms, other appropriate thicknesses may be used without departing from the scope of the present disclosure. For example, in alternative embodiments, micromirror support layer 240 may be sufficiently thick to completely fill micromirror support vias 230 and form an outermost surface that is substantially flat. In addition, in such alternative embodiments, sidewalls 250 and 255 may join to form one common sidewall. Significantly, such alternative embodiments may not include an additional metal deposition step as illustrated in FIG. 2D.

FIG. 2D shows a cross sectional view of DMD 200 after formation of a micromirror layer 260 outwardly from micromirror support layer 240. Although micromirror layer 260 and micromirror support layer 240 are shown as being formed without interstitial layers between them, such interstitial layers could alternatively be formed without departing from the scope of the present disclosure.

Micromirror layer 260 may comprise, for example, materials substantially similar in composition as micromirror support layer 240 of FIG. 2C. Forming micromirror layer 260 may be effected through any of a variety of processes. For example, micromirror layer 260 may be formed by depositing an isotropic physical vapor deposition (PVD) layer of an aluminum alloy. In this particular non-limiting example, micromirror support layer 260 can be formed by depositing aluminum to a thickness of approximately 2480 angstroms. Although this example uses a micromirror layer 260 thickness of approximately 2480 angstroms, other appropriate thicknesses may be used without departing from the scope of the present disclosure. An appropriate micromirror layer 260 thickness at least includes thicknesses sufficient to form a substantially flat outermost surface 280 disposed outwardly from micromirror support structure 275. In this embodiment, surface 280 is substantially coplanar to the remainder of the outer micromirror surface.

As discussed above with regard to modulator 16 of FIG. 1, DMD 200 may include an array of hundreds of thousands of tilting micromirrors. In this particular example, at some point one or more micromirrors are formed within micromirror layer 260. Forming the micromirrors may be effected through any of a variety of processes. For example, the micromirrors may be formed by removing portions of layers 240,260. In this particular non-limiting embodiment, the micromirrors are formed by patterning and etching micromirror layer 260 and micromirror support layer 240 simultaneously.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A method of forming a micromirror element comprising:
   forming a sacrificial layer;
   forming at least one micromirror support via by selectively removing an annular-shaped portion of the sacrificial layer;
   forming a first portion of a micromirror support structure within the at least one micromirror support via and a second portion of the micromirror support structure outwardly from the sacrificial layer; and
   forming a substantially flat micromirror surface outwardly from the first and second portions of the micromirror support structure.

2. The method of claim 1, wherein forming a second portion of the micromirror support structure outwardly from the sacrificial layer comprises encapsulating a portion of the sacrificial layer within annular-shaped sidewalls of the support structure.

3. The method of claim 1, wherein forming the first portion of the micromirror support structure within the at least one micromirror support via comprises filling the micromirror support via with the first portion of a micromirror support structure.

4. The method of claim 3, further comprising: filling the micromirror support via with a single layer having sufficient thickness to form a substantially flat outer surface disposed outwardly from the micromirror support via.

5. The method of claim 3, further comprising: filling the micromirror support via with a plurality of layers.

6. The method of claim 5, wherein filling the micromirror support via with a plurality of layers comprises forming an anisotropic physical vapor deposition layer.

7. The method of claim 6, further comprising: forming an isotropic physical vapor deposition layer outwardly from the anisotropic physical vapor deposition layer.

* * * * *